(12) United States Patent
Li et al.

(10) Patent No.: US 11,294,117 B2
(45) Date of Patent: Apr. 5, 2022

(54) ELECTRONIC DEVICE WITH DISPLAY SCREEN

(71) Applicant: Coretronic Corporation, Hsin-Chu (TW)

(72) Inventors: Cheng-Tsung Li, Hsin-Chu (TW); Tzeng-Ke Shiau, Hsin-Chu (TW); Bing-Han Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/748,811

(22) Filed: Jan. 22, 2020

(65) Prior Publication Data

US 2020/0241193 A1 Jul. 30, 2020

(30) Foreign Application Priority Data

Jan. 30, 2019 (CN) .......................... 201910091619.0

(51) Int. Cl.
  *F21V 8/00* (2006.01)
  *G06F 3/041* (2006.01)
  *G06F 1/16* (2006.01)

(52) U.S. Cl.
  CPC ......... *G02B 6/0053* (2013.01); *G02B 6/0051* (2013.01); *G02B 6/0055* (2013.01); *G06F 1/1637* (2013.01); *G06F 3/041* (2013.01)

(58) Field of Classification Search
  CPC .. G02B 6/0051; G02B 6/0053; G02B 6/0055; G06F 1/1637
  See application file for complete search history.

(56) References Cited

U.S. PATENT DOCUMENTS

| | | | |
|---|---|---|---|
| 9,152,371 B2 | 10/2015 | Sirpal et al. | |
| 2008/0310003 A1* | 12/2008 | Mi | ........ G02B 6/0053 |
| | | | 359/238 |
| 2010/0182265 A1* | 7/2010 | Kim | ........ G06F 1/1641 |
| | | | 345/173 |
| 2013/0076632 A1* | 3/2013 | Sirpal | ........ G06F 3/0346 |
| | | | 345/168 |
| 2016/0091654 A1* | 3/2016 | Kim | ........ G02F 1/136286 |
| | | | 349/65 |
| 2017/0336542 A1* | 11/2017 | Tai | ........ G02B 5/0231 |

FOREIGN PATENT DOCUMENTS

| | | |
|---|---|---|
| CN | 101529324 B | 2/2011 |
| CN | 102714743 A | 10/2012 |
| CN | 102967987 A | 3/2013 |
| TW | 201812346 A | 4/2018 |

* cited by examiner

*Primary Examiner* — Rajarshi Chakraborty
*Assistant Examiner* — Nathaniel J Lee

(57) ABSTRACT

An electronic device with a display screen includes a first body and a first display screen. The first body has an operation surface, the operation surface has a first side and a second side opposite to the first side, and the first side is defined as a user side. The first display screen is disposed in the first body, and the operation surface exposes the first display screen. The first display screen includes a backlight module and a display panel. The backlight module includes a light guide plate, a light source, and has only one prism sheet. The light guide plate has a light incident surface and a light exit surface, and the light incident surface faces the second side. The light source is disposed between the light incident surface and the second side. The prism sheet is disposed between the light exit surface and the display panel.

7 Claims, 5 Drawing Sheets

ELECTRONIC DEVICE WITH DISPLAY SCREEN

CROSS-REFERENCE TO RELATED APPLICATION

This application claims the priority benefit of China application 201910091619.0, filed on 2019 Jan. 30. The entirety of the above-mentioned patent application is hereby incorporated by reference herein and made a part of this specification.

FIELD OF THE INVENTION

The invention relates to an electronic device, and more particularly to an electronic device with a display screen.

BACKGROUND OF THE INVENTION

The screen of the laptop and the case are often connected by hinging, and the angle between the screen and the case may be adjusted according to different users or usage habits. Therefore, in general, the screen is designed to exhibit optimal optical performance at a viewing angle of 0° (the normal direction of the screen), allowing the user to adjust the angle between the screen and the case to meet the demand.

However, if the second screen is configured on the case, the angle may not be adjusted arbitrarily when the case is placed on the table. In the case where the configuration of the screen is unchanged, the user's viewing angle of the second screen is not in front viewing angle, which causes the user to have a problem of insufficient brightness when viewing the second screen.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an electronic device with a display screen, which can improve the brightness of a display screen when a user views the display screen in a not in front viewing angle, and may save costs compared with the prior art.

Other advantages and objects of the invention may be further illustrated by the technical features broadly embodied and described as follows.

In order to achieve one or a portion of or all of the objects or other objects, an electronic device with a display screen provided in an embodiment of the invention includes a first body and a first display screen. The first body has an operation surface, the operation surface has a first side and a second side opposite to the first side, and the first side is defined as a user side. The first display screen is disposed in the first body, and the operation surface exposes the first display screen. The first display screen includes a backlight module and a display panel. The backlight module includes a light guide plate, a light source, and has only one prism sheet. The light guide plate has a light incident surface and a light exit surface adjacent to the light incident surface, and the light incident surface faces the second side. The light source is disposed between the light incident surface and the second side. The prism sheet is disposed between the light exit surface and the display panel.

In the electronic device with the display screen of the invention, the backlight module of the first display screen has only one prism sheet. Compared with the known backlight module using the structure of two prism sheets, the backlight module structure of the invention can exhibit a maximum brightness value in a direction which the light emission is not in normal direction. When a user views the display screen not in a front viewing angle on the user side, the brightness performance in the user's viewing direction can be improved, and it also saves costs by using only one prism sheet.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
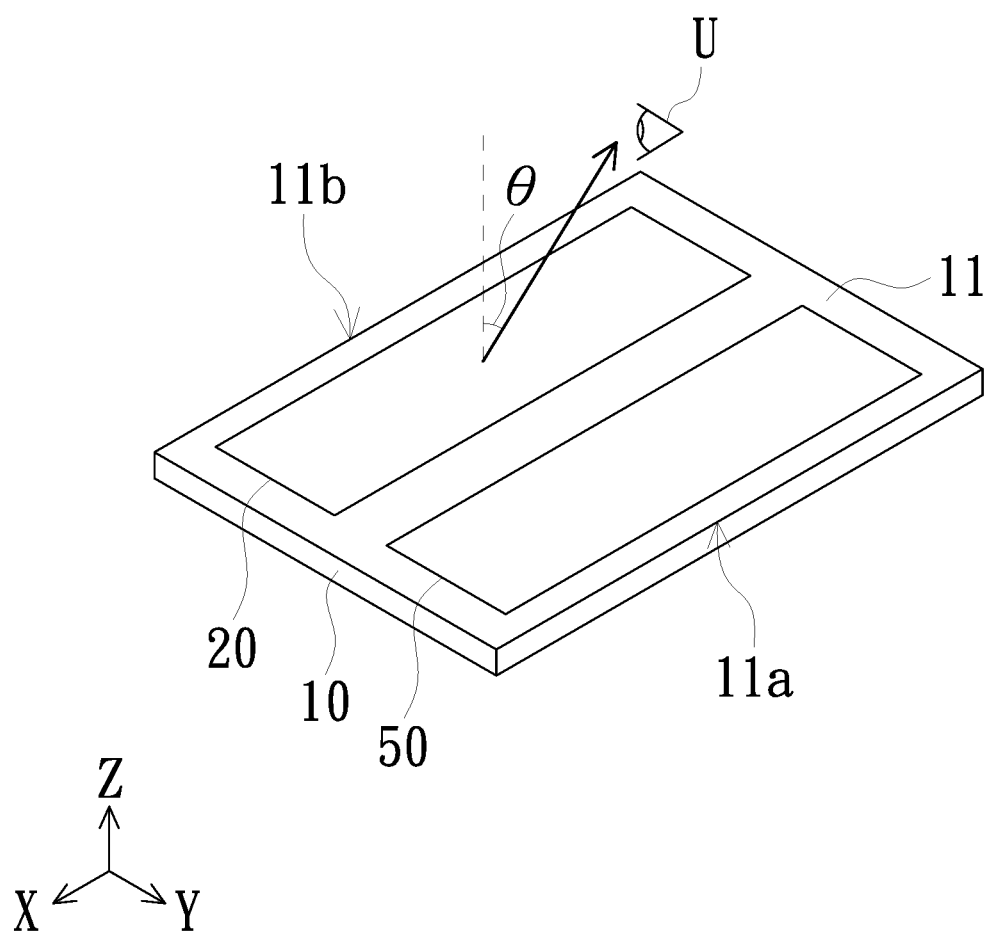
FIG. 1 is a schematic perspective view of an electronic device with a display screen of one embodiment of the invention.
Figure 2:
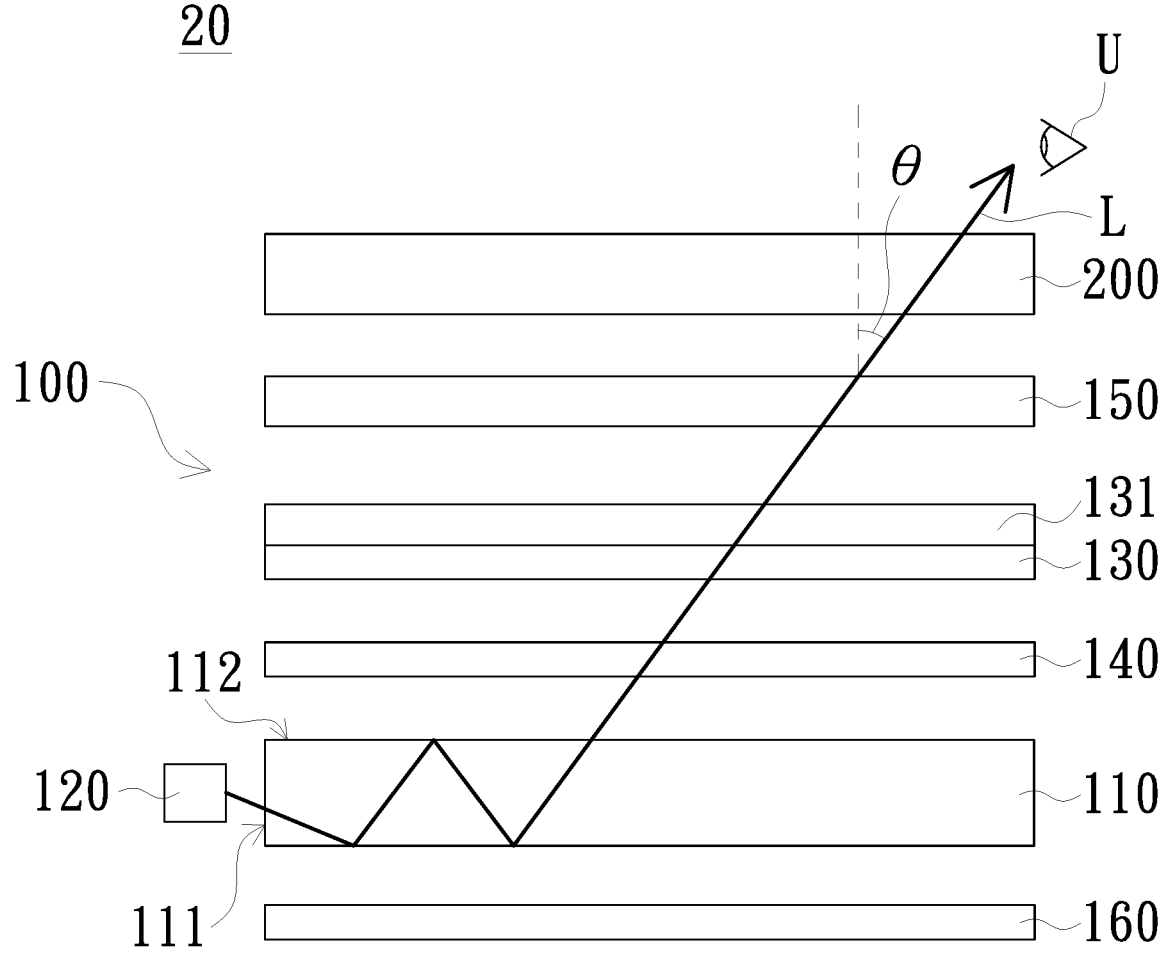
FIG. 2 is a schematic view of a backlight module of FIG. 1 in a YZ plane.

FIG. 1 is a schematic perspective view of an electronic device with a display screen of one embodiment of the invention. FIG. 2 is a schematic view of a backlight module of FIG. 1 in a YZ plane. Referring to FIG. 1 and FIG. 2, an electronic device with a display screen 1 of the embodiment includes a first body 10 and a first display screen 20. The first body 10 has an operation surface 11, the operation surface 11 has a first side 11a and a second side 11b opposite to the first side 11a, and the first side 11a is defined as a user side. The user side 11a is preset to allow a user U to use or operate the electronic device with the display screen 1 on the side, and an image of the first display screen 20 viewed on the user side 11a is normal display, instead of being rotated by 90° or upside down. The first display screen 20 is disposed in the first body 10, and the operation surface 11 exposes the first display screen 20.

The electronic device with the display screen 1 of the embodiment is, for example, a tablet computer, which is usually fixed or laid flat on a plane to use. Therefore, a viewing angle of the user U usually is not in a normal direction of the first display screen 20 when using the electronic device with the display screen 1, that is, the viewing angle θ is not 0° (the normal direction of the screen). Herein, the viewing angle θ when the user U views on the use side 11a is defined as a positive value.

The electronic device with the display screen 1, for example, further includes at least one operating element 50, which is disposed on the operating surface 11 of the first body 10, but is not limited thereto. In other embodiments, the operation surface 11 of the first body 10 has, for example, only the first display screen 20. The operating element 50 is, for example, located between the first display screen 20 and the first side (the user side) 11a to facilitate operation or use by the user U. The operating element 50 includes, for example, at least one of a touch panel and a keyboard, but is not limited thereto. In addition to the operating element 50, the operating surface 11 of the first body 10 can also be provided with, for example, a speaker or other electronic element.

The first display screen 20 includes a backlight module 100 and a display panel 200. The backlight module 100 includes a light guide plate 110, a light source 120, and has only one prism sheet 130. The light guide plate 110 has a light incident surface 111 and a light exit surface 112 adjacent to the light incident surface 111, and the light incident surface 111 faces the second side 11b in FIG. 1. The light source 120 is disposed between the light incident surface 111 and the second side 11b in FIG. 1. The prism sheet 130 is disposed between the light exit surface 112 and the display panel 200. A light L shown in FIG. 2 is illustrated from the viewpoint of the overall path, and does not represent an optical path which the light actually passes through each element of the backlight module 100.

The light source 120 is, for example, a strip light source including a plurality of point light sources, and the plurality of point light sources are arranged along the X-axis direction in FIG. 2. The point light source is, for example, a light emitting diode (LED), but is not limited thereto. The light source 120 can also be other types of strip light sources, such as a light tube, and the invention does not limit the type of light source.

The display panel 200 is, for example, a liquid crystal display panel or other non-self-luminous display panel.

The backlight module 100 further includes, for example, a first diffusion sheet 140 and a second diffusion sheet 150. The first diffusion sheet 140 is disposed between the prism sheet 130 and the light guide plate 110, and the prism sheet 130 is disposed between the first diffusion sheet 140 and the second diffusion sheet 150. The first diffusion sheet 140 and the second diffusion sheet 150 are adapted to improve the uniformity of light emission of the backlight module 100 as a whole.

The backlight module 100 further includes a reflection sheet 160 disposed on a side of the light guide plate 110 away from the prism sheet 130 to reflect light leaking from the light guide plate 110 to the reflection sheet 160 back into the light guide plate 110 to improve light utilization efficiency.

The principle of refracting the light emitted by the light source by using the prism sheet can achieve the effect of concentrating the light. In the structure of the known backlight module using two prism sheets whose prism columns are perpendicular to each other, in the cross section parallel to the prism columns of the two prism sheets (for example, corresponding to a XZ plane and a YZ plane of FIG. 1), a light distribution curve diagram has a maximum brightness value when a viewing angle is 0°. The backlight module 100 of the first display screen 20 of the embodiment has only one prism sheet 130. Under this structure, the maximum brightness value of the light distribution curve diagram in the YZ plane of the embodiment, for example, does not appear at the viewing angle θ of 0°.

Figure 3:
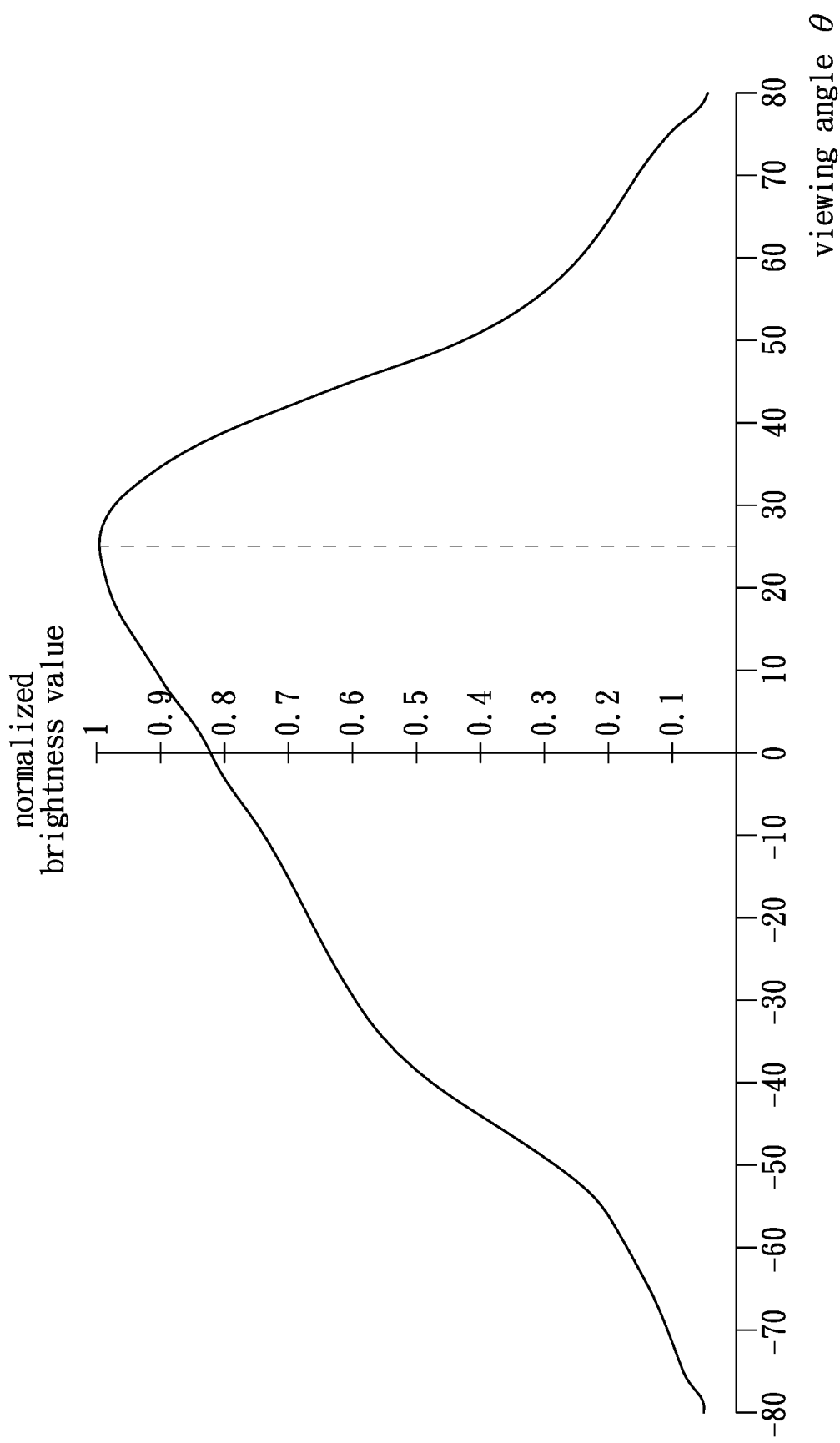
FIG. 3 is a light distribution curve diagram of a backlight module of one embodiment of the invention.

Taking FIG. 3 as an example, it is a light distribution curve diagram of the backlight module 100 in the cross section perpendicular to the light incident surface 111 and the light exit surface 112 (shown in the cross-sectional view of FIG. 2), wherein the horizontal axis is the viewing angle θ and the vertical axis is the brightness value. In FIG. 3, a maximum brightness value appears at a viewing angle θ of 25°. Therefore, in FIG. 2, when the user U views the first display screen 20 not in a front viewing angle (i.e. when the viewing angle θ is not 0°, the structure of the backlight module 100 of the embodiment can improve the brightness of the viewing direction of the user U. In other embodiments, the maximum brightness value may be designed such that the viewing angle θ of the use side 11a is between 5° and 40° to meet most of the usage requirements. In addition, since only one prism sheet 130 is used, cost can be saved compared to the known backlight module.

Figure 4:
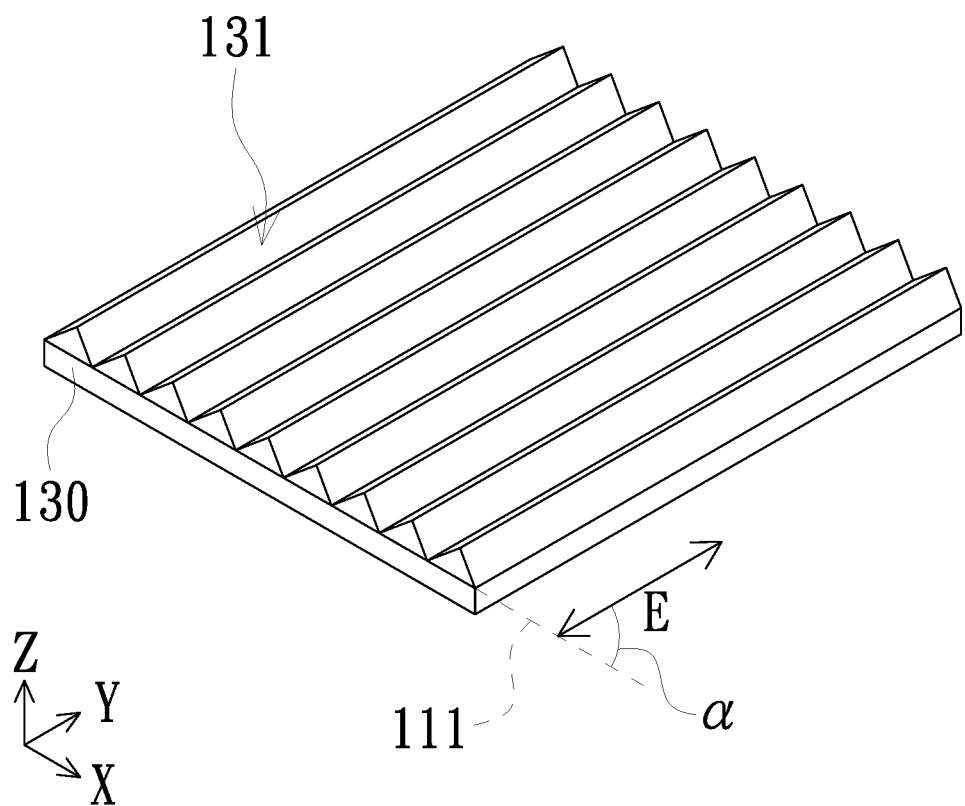
FIG. 4 is a schematic perspective view of a prism sheet of one embodiment of the invention.

FIG. 4 is a schematic perspective view of a prism sheet of one embodiment of the invention. Referring to FIG. 2 and FIG. 4, the prism sheet 130 includes a plurality of prism columns 131. The prism columns 131, for example, face the display panel 200, and an included angle α between an extending direction E of the prism columns 131 and the light incident surface 111 (indicated by an extended dotted line in FIG. 4) in FIG. 2 is between 0° and 180°, as shown in FIG. 2 and FIG. 4, that is, the included angle α is not particularly limited, and may be adjusted according to design requirements. In one embodiment, if it is desirable to have the maximum brightness value of the light emission when the viewing angle θ of the use side 11a is between 5° and 40°, the range of the included angle α is designed to be between 91° and 95°, for example, 93°.

For comparison of the measurement results of the maximum brightness value, a viewing angle test instrument used in the invention is CONOMETER 80 of Westboro Photonics. The measurement method is a comparison of a brightness value of a known backlight module (two prism sheets) and a backlight module of one embodiment of the invention (one prism sheet) at a viewing angle θ of 25°, and the results are shown in Table 1. Compared with the structure of the known backlight module, the backlight module of the embodiment of the invention can increase the brightness value at the viewing angle θ of 25° by 45.6% ((518−282)/518×100%=45.6%).

TABLE 1

Comparison diagram of brightness values of the backlight module of the invention and a known backlight module

| | brightness |
|---|---|
| known backlight module (two prism sheets) | 282 |
| backlight module of the invention (one prism sheet) | 518 |

Figure 5:
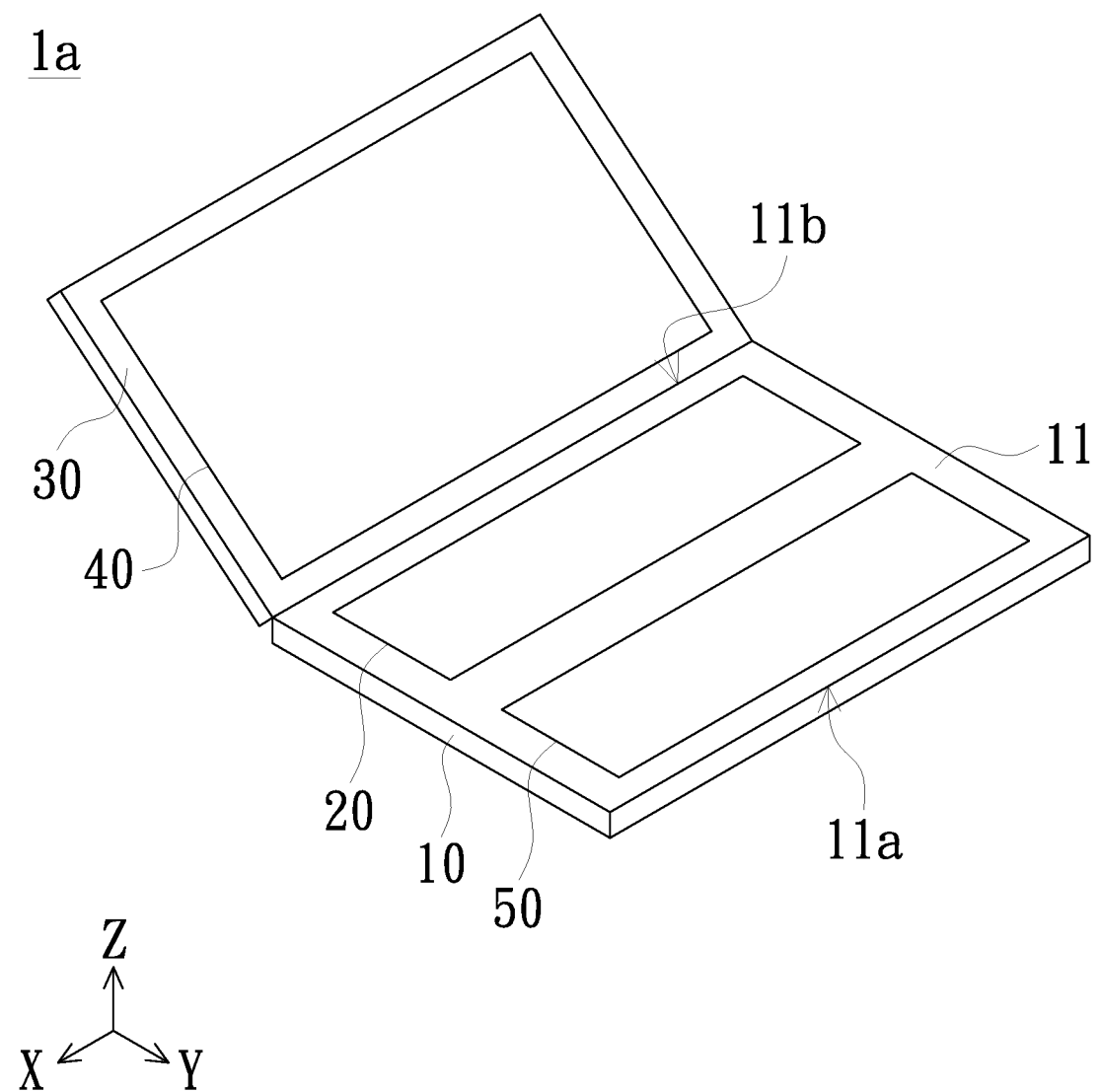
FIG. 5 is a schematic perspective view of an electronic device with a display screen of another embodiment of the invention.

FIG. 5 is a schematic perspective view of an electronic device with a display screen of another embodiment of the invention. Referring to FIG. 5, the electronic device with display screen 1a of the embodiment is similar in structure and advantages to the electronic device with display screen 1 described above, and only the main differences in the structure will be described below. The electronic device with the display screen 1a of the embodiment further includes a second body 30 and a second display screen 40, as compared to the electronic device with the display screen 1. The second body 30 is hinged to the first body 10, and the hinge of the second body 30 to the first body 10 is adjacent to the second side 11b. The second display screen 40 is disposed in the second body 30. Specifically, the electronic device with the display screen 1a is a foldable electronic device, for example, a laptop. In one embodiment, the light source of the first display screen 20 (not shown in FIG. 5) is adjacent to the hinge of the first body 10 to the second body 30, and the light source of the second display screen 40 (not shown in FIG. 5) is adjacent to the hinge of the second body 30 to the first body 10, but is not limited thereto.

In summary, in the electronic device with the display screen of the invention, the backlight module of the first display screen has only one prism sheet. Compared with the known backlight module using the structure of two prism sheets, the backlight module structure of the invention can exhibit a maximum brightness value in a direction which the light emission is not in front direction. When a user views the display screen not in a front viewing angle on the user side, the brightness performance in the user's viewing direction can be improved, and it also saves costs by using only one prism sheet.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first body, the second body, the first display screen, the second display screen, the first side, the second side, the first diffusion sheet and the second diffusion sheet are only used for distinguishing various elements and do not limit the number of the elements.

What is claimed is:

1. An electronic device with a display screen, comprising:
a first body, having an operation surface, the operation surface has a first side and a second side opposite to the first side, and the first side is defined as a user side; and
a first display screen, disposed in the first body, and the operation surface exposes the first display screen, the first display screen comprises a backlight module and a display panel, the backlight module comprises a light guide plate, a light source, and has only one prism sheet, the light guide plate has a light incident surface and a light exit surface adjacent to the light incident surface, and the light incident surface faces the second side, the light source is disposed between the light incident surface and the second side, the prism sheet is disposed between the light exit surface and the display panel,
a second body, hinged to the first body, and a hinge of the second body to the first body is adjacent to the second side; and a second display screen, disposed in the second body, wherein in a cross section perpendicular to the light incident surface and the light exiting surface, a maximum brightness value of a light distribution curve of the backlight module appears at a viewing angle of 5° to 40° on the user side, wherein the light source is disposed in the first body and adjacent to the hinge between the first display screen and the second display screen, wherein the prism sheet comprises a plurality of prism columns facing the display panel, and an included angle between an extending direction of the plurality of prism columns and the light incident surface is between 90° and 95°.

2. The electronic device with the display screen according to claim 1, wherein the included angle between the extending direction of the plurality of prism columns and the light incident surface is between 91° and 95°.

3. The electronic device with the display screen according to claim 1, further comprising at least one operating element, disposed to the operating surface of the first body.

4. The electronic device with the display screen according to claim 3, wherein the at least one operating element is located between the first display screen and the first side.

5. The electronic device with the display screen according to claim 3, wherein the at least one operating element comprises at least one of a touch panel and a keyboard.

6. The electronic device with the display screen according to claim 1, wherein the backlight module further comprises a first diffusion sheet and a second diffusion sheet, the first diffusion sheet is disposed between the prism sheet and the light guide plate, the prism sheet is disposed between the first diffusion sheet and the second diffusion sheet.

7. The electronic device with the display screen according to claim 1, wherein the backlight module further comprises a reflection sheet disposed on a side of the light guide plate away from the prism sheet.

* * * * *